Dec. 16, 1958
R. L. MILLAR ET AL
PLURAL COATING WITH EPOXY PRIMER
AND ALKYD-SILICONE TOPCOAT
Filed March 1, 1955
2,864,722
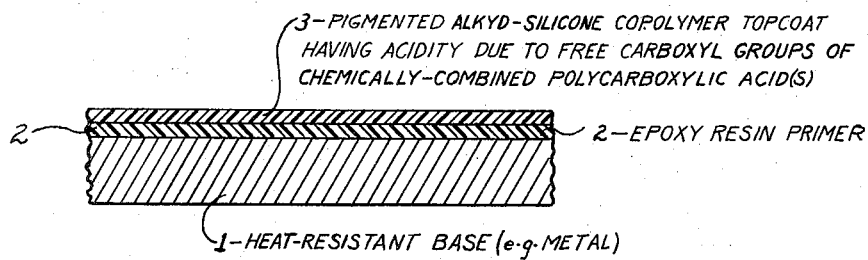
3—PIGMENTED ALKYD-SILICONE COPOLYMER TOPCOAT
HAVING ACIDITY DUE TO FREE CARBOXYL GROUPS OF
CHEMICALLY-COMBINED POLYCARBOXYLIC ACID(S)
2—EPOXY RESIN PRIMER
1—HEAT-RESISTANT BASE (e.g. METAL)
RONALD L. MILLAR
NORMAN G. PETERSON
INVENTORS
BY *G.G. Christensen*
ATT'Y

United States Patent Office 2,864,722
Patented Dec. 16, 1958

2,864,722

PLURAL COATING WITH EPOXY PRIMER AND ALKYD-SILICONE TOPCOAT

Ronald L. Millar and Norman G. Peterson, Chicago, Ill., assignors to The Glidden Company, Cleveland, Ohio, a corporation of Ohio Application March 1, 1955, Serial No. 491,548

10 Claims. (Cl. 117—72)

This invention relates to a novel two-coat finishing system especially intended for use on base materials which will withstand baking temperatures. It represents an improvement on the one-coat system described and claimed in the compending application of Millar, Moore and Peterson, entitled, "Silane Derivative-Epoxide Resin Composition and Coatings Thereof," Serial No. 274,826, filed March 4, 1952, now U. S. Patent No. 2,768,150. In that application a siloxypolyalcoholide-polybasic acid reaction product is mixed with an epoxide composition to prepare a one-coat coating composition which can be cure by baking. Such one-coat composition has been found to possess certain deficiencies most of which have been traced primarily to the presence of phenolic ether linkages throughout the coating film. These deficiencies have been evidenced by dulling when exposed to weathering, yellowing under the influence of ultraviolet, and heat resistance below that which might be expected from a composition of this type.

We have now found that various unexpected advantages can be obtained while at the same time the above deficiences can be overcome by utilizing a two-coat system in which an epoxy primer is coated with a pigmented acidic siloxy top coat. We have discovered that the two separate coats, applied in this manner and suitably cured by baking, exhibit performance characteristics which cannot be equalled or even approached by the individual coats when cured apart from each other under the same conditions. The two-coat system gives excellent weathering characteristics, freedom from discoloration, improved heat resistance, excellent gloss retention and excellent corrosion resistance.

Accordingly, it is an object of this invention to provide a novel two-coat coating system employing an epoxy priming coat and a pigmented, acidic siloxy top coat.

Another object is to overcome the deficiencies exhibited in the prior one-coat epoxy-siloxy coating composition of the copending application identified above.

These and other objects will be apparent from the following description of the invention, taken in conjunction with the attached single figure of drawings, in which the figure represents an enlarged vertical sectional view of a portion of a partly-finished article which has been coated with the coating system of the invention. A suitable heat-resistant base 1 is coated with a non-tacky but uncured priming coat 2 of epoxy resin and then with a pigmented top-coat 3 of acidic alkyd-silicone copolymer resin, the acidity of the latter being due to unreacted carboxyl groups of polycarboxylic acid which has been chemically combined with components of the alkyd-silicone copolymer.

In accordance with the present invention, the epoxy component of the prior one-coat composition is applied separately from the siloxy component thereof as a priming coat. It is then baked sufficiently to drive off the solvent contained therein, but not necessarily long enough to polymerize it appreciably. Then the siloxy component carying sufficient pigment to provide good hiding of the primer and to give a durable top-coat is applied over the primer and the resulting doubly-coated article is baked under conditions of time and temperature appropriate to bring about proper curing of the coating system.

The siloxy top coat is formulated with an appreciable quantity of excess acid, preferably polycarboxylic acid, and this acidity is responsible in large measure for at least some of the improved characteristics of the combination in comparison with the one-coat system. The copending application supra which describes the one-coat system discusses the need for free acid to promote the cure of the epoxy moiety, but it also explains that the presence of free acidity in the one-coat liquid coating sometimes leads to difficulties particularly in causing the siloxy- and epoxy-moieties to be incompatible with each other. Since compatibility is not necessary in the present two-coat system, the free acidity of the siloxy top coat can be at any desired or necessary level. Accordingly, separation of the moieties, as in the present invention, affords greater flexibility in the formulation of both the siloxy film and the epoxy film.

It should not be thought that the present invention merely separates the two moieties of the prior one-coat composition simply to permit them to be applied as separate coats and then again diffused each into each other during baking. While this conceivably could occur if extremely thin primer and top coats were employed, we have found that when useful film thicknesses of primer and top coat are applied in accordance with the present invention, both films remain substantially distinct from each other at the conclusion of the bake except for a very thin diffusion zone at the interface between the two coats. This diffused interface promotes good intercoat adhesion but this is not the only evidence that the juxtaposition of the two uncured coats has induced each to alter the characteristics of the other. For example, we have found that the resistance to hot detergent solutions, which is a phenomenon necessarily associated with portions of both the primer and the top coat remote from the interface, is markedly improved. This was learned by comparing panels coated with the two-coat system against panels coated with the siloxy top-coat alone and with the primer alone, all sets of panels having been baked together under controlled conditions designed for the purpose, and then simultaneously exposed to hot detergent solution under identical conditions. These and other unexpected and un-obvious benefits flowing from the use of two separate coats are illustrated in the examples given hereinafter.

As mentioned above, the present invention affords greater flexibility in the formulation of both the primer and the top coat. Thus the scope of formulation of each is somewhat wider than in the one-coat system. The siloxy moiety of the present invention can use any alkyd-silicone copolymer film-forming system. The alkyd in such system can be any resinous material prepared from substantially saturated polycarboxylic acid(s) and polyhydric alcohol(s), and can be modified or not with monocarboxylic acids having up to 18 carbons. The siloxypolyalcoholide materials disclosed in the one-coat system of the copending application are regarded by us as yielding alkyd-silicone copolymers within the foregoing expression.

Any alkyd-silicone copolymer(s) or mixtures thereof, with or without additional alkyd or other non-silicone film-former can be used in the top coat except any which are non-homogeneous or unstable. Examples of alkyd-modified siloxanes suitable for use in the present invention are disclosed in the following patents: Doyle and Nelson U. S. Patent No. 2,587,295, the British Bowman Patent No. 583,754 of 1946, the British Thomson-Houston application No. 29,237 which has been opened to inspection by the British Patent Office, and U. S. Patent No. 2,663,-694 issued to R. L. Millar and entitled, "Alkyd-Modified Siloxane Coating Composition and Process." The co-pending United States application of R. L. Millar, Serial No. 320,120, filed November 12, 1952, now U. S. Patent No. 2,768,149, also discloses various compositions appropriate for use in the present invention. In the category of siloxy polyalcoholide-polybasic acid condensates are the materials disclosed in the one-coat system of the copending application, Serial No. 274,826, supra. Where the siloxy film-former which is selected for use as the vehicle of the top coat does not already contain sufficient excess acidity for curing the primer, then it should be modified to provide appropriate amounts of available carboxyls. These can be provided by cooking the siloxy vehicle with polycarboxylic acids.

The siloxy top coat should preferably provide enough excess acidity in the form of reactive carboxyls to cause it to gel when heated for a long period of time. In preparing it, however, it is not heated long enough to be gelled. Thus the ability to gel on long heating is simply a test for determining the preferred amount of excess acidity. A test of this nature is needed because we have been unable to find any rational basis for expressing the amount of available acidity as an independent factor. Thus the amount varies with the particular siloxy materials used and with the extent of reaction involved in the resulting siloxy vehicle. It varies also with the extent of reaction between the siloxy vehicle and the polycarboxylic acid which is to provide the available reactive carboxyls in the finished liquid top-coat, with the constitution, molecular weight, epoxy equivalent, hydroxyl equivalent, and proportion of epoxy resin in the applied film of epoxy primer; with the desired variations in flexibility, hardness, adhesion, alkali-resistance and other properties of the baked two-coat system; and with the baking schedule.

It will be understood that while our siloxy top-coat must have some measurable excess of acidity, and that the preferred amount thereof is as stated above, there is no maximum limit up to the point where the proportion of the excess carboxyls prevents the preparation of a stable solution of the silicone top-coat in organic solvent(s). This usually corresponds to an acid number of about 100 on a solids basis. In this connection, it should also be understood that the acidity should not be derived from polycarboxylic acids which are not chemically combined with the silicone film-former.

The siloxy vehicle of the top coat should be pigmented sufficiently to give good hiding of the primer and to give the desired surface sheen and other film characteristics. Any pigments can be used for this purpose as long as they are not harmed or otherwise disadvantageously affected by the acidic nature of the top coat vehicle and by the baking temperature of the resultant coating. Pigmentation of the top coat, while affording desired color therein, is also important in the present invention as a means for protecting the primer from harmful deterioration induced by radiant energy such as ultra-violet light. Accordingly, it is important to adjust the pigmentation and film thickness of the top coat so as to secure this protection. Pigmentation should be at least sufficient to give substantially complete opacity at film thicknesses of 0.5 mil or greater, depending on color.

The primer vehicle or film-former as indicated above is one containing reactive epoxy groups, usually in a terminal position of the molecule. Such film-formers generally also contain reactive hydroxyls as substituents of the polymeric molecule and are free of other reactive groups. Such epoxy film-formers are available commercially and can be formulated with usual priming pigment(s) (if used), solvents, etc. to give primers yielding films which are non-tacky at room temperature after being dried.

Fundamentally, of course, the epoxy film-formers of the primer should be of a type which is capable of curing to a durable film on baking in the presence of and/or with the assistance of free polycarboxylic acid(s). Such film-formers are disclosed in U. S. Patents 2,324,483 and 2,500,449.

In general, the epoxy moiety is a resinous material and is preferably the reaction product of dihydric phenols and polyfunctional halohydrins. The resinous material is characterized by containing epoxy groups and being free of functional groups other than epoxy and hydroxyl groups. When it is derived from dihydric phenols and polyfunctional halohydrins, these materials are reacted in manners and proportions well understood in the art (for example, Greenlee Patent No. 2,521,911, of September 12, 1950) so as to form a complex epoxide resin of the type described. Epichlorhydrin and glycerol dichlorhydrin are examples of polyfunctional halohydrins, while resorcinol and "bisphenol" are examples of dihydric phenols useful in forming such epoxide resins. "Bis-phenols" may be prepared by methods such as are described in U. S. Patent No. 2,182,308 using phenol and various ketones having up to 6 carbons in each chain attached to the keto group.

The complex epoxide resins contemplated for use in our invention may have a wide range of functionality due to the relative proportions of epoxy and hydroxyl groups in the molecule. As is shown in subsequent examples, excellent coating compositions may be prepared in accordance with the invention by employing "bis-phenol"-epichlorhydrin resins having an epoxide equivalent of from 170 to 400, corresponding to an hydroxyl equivalent of 85 to 114. It is known that the epoxy equivalent weight or the epoxy-plus-hydroxyl equivalent weight of any complex epoxide resin such as described above may be related somewhat to the "$n$" value of the formula which theoretically expresses the general chemical nature of the resins resulting from condensation of a polyhydric phenol with epichlorhydrin. Such a formula is:

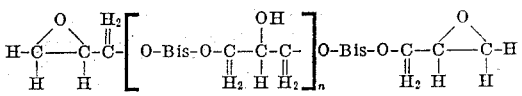

where "Bis" represents a dihydric phenolic residue such as the "bisphenol" residue:

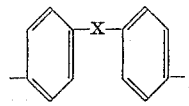

wherein X is the hydrocarbon residue of any cyclic ketone of up to 6 carbons, inclusive, or is the group

in which R represents any alkyl, aryl or alicyclic group having up to 6 carbons inclusive and R' represents any alkyl group of up to 6 carbons, inclusive. The "$n$" value of the epichlorhydrin-"bisphenol" condensate should be above 1 in resins which we have found to be satisfactory for use in preparing our compositions, but we prefer "$n$" values above 3. Various complex epoxy resins of the types described above are currently available as commercial products under the trade-name of "Epon Resins" (Shell Chemicals Company), and are supplied with information concerning their epoxy and epoxy-plus-hydroxyl equivalents. The "Epon" resins referred to hereinafter in the examples are the reaction products of epichlorhydrin and 4-4'-dihydroxy-diphenyl-2,2-propane.

The following examples illustrate the principles and discoveries on which the present invention is founded.

Example 1

Primers were made containing the following ingredients:

| | |
|---|---|
| Epoxy resin (Epon 1001[a]) | lbs 3.30 |
| Lithopone | lbs 2.75 |
| Rutile $TiO_2$ | lbs 1.00 |
| N-7[b] ethyl cellulose | oz. by wt 0.25 |
| Ethylene glycol monoethyl ether acetate | lbs 5.52 |

[a] Epon 1001 is a commercial designation of a product of the Shell Chemicals Company, and is an epoxy resin having a hydroxyl equivalent of 130, and an epoxy equivalent of 450-525.

[b] A commercial designation for a product of the Hercules Powder Company.

The epoxy resin was dissolved in part of the ethylene glycol monoethyl ether acetate and this solution together with the remaining ingredients above was ground in a pebble mill until a uniform dispersion of the pigment was attained.

Example 2

A primer was prepared according to the formulation of Example 1 except that the epoxy resin was the Shell Chemicals Company's Epon Resin 1004. The latter has a hydroxyl equivalent of 175 and an epoxy equivalent of 905-985.

Example 3

A primer was prepared according to the formulation of Example 1 except that the epoxy resin was the Shell Chemicals Company's Epon Resin 1007. The latter has a hydroxyl equivalent of 190 and an epoxy equivalent of 1600 to 1900.

Example 4

Using the same procedure as in Examples 1 to 3 a primer was made from the following ingredients:

| | Lbs. |
|---|---|
| Epoxy resin (Epon 1007) | 2.93 |
| Lithopone | 2.75 |
| Rutile $TiO_2$ | 1.00 |
| N-7 ethyl cellulose | 0.25 |
| Ethylene glycol monoethyl ether acetate | 2.86 |
| High-flash naphtha | 1.75 |
| Toluene | 0.68 |

Example 5

A siloxy glyceride was prepared from the following ingredients:

| | |
|---|---|
| Phenylmethyldiethoxysilane | 378 g. (1.8 mols). |
| Phenyltriethoxysilane | 48 g. (0.2 mols). |
| USP glycerine (95% glycerine) | 193 g. (2.0 mols). |
| Concentrated HCl | 1-2 g. |

These materials were mixed and heated to reflux in a three necked flask equipped with agitator, thermometer and condenser. After holding at reflux for ½ hour, distillation of ethanol was started. When the batch temperature reached 392° F. (requiring about 3 hours), the theoretical amount of ethanol had been recovered.

The siloxy glyceride was cooled to 140° C. and 42 g. phthalic anhydride was added. The temperature of 140° C. was maintained for one hour, whereupon the product was thinned with 78.5 g. of methyl isobutyl ketone. A trap suitable for the azeotropic removal of water was attached to the flask. Phthalic anhydride in the amount of 352 g. was then added and the mixture heated at reflux (320-360° F.) for 6-8 hours. The batch was then thinned with 460 g. of cyclohexanone. The viscosity of the resultant solution was "W" (Gardner-Holdt).

Pigment was then ground with the above resin solution in a pebble mill to give an enamel of the following composition:

| | Oz. by wt. |
|---|---|
| Rutile $TiO_2$ | 4.17 |
| Resin solution | 6.5 |
| Butyl acetate | 1.0 |
| Ethylene glycol monoethyl ether acetate | 0.5 |

Example 6

A Pfaudler was loaded with 1146 pounds (6 mols) phenylmethyldichlorosilane and 634.5 pounds (3 mols) phenyltrichlorosilane. 504 pounds of methanol (equivalent to 75 percent of the chloride) were slowly added. Water equivalent to 35 percent of original chloride was then added in the form of a mixture of 66.2 pounds water and 66.2 pounds methanol. The reaction product was refluxed, then heated to a pot temperature of 150° C. at atmospheric pressure to distill off the volatiles. Sodium bicarbonate equivalent to 2 or 3 times the amount of acid still present was then added. The material was then reheated to 150° C. to remove methanol formed by the water of neutralization. The product was filtered to remove any solid matter present.

Example 7

The following ingredients were added to a kettle suitably equipped for azeotropic separation of the water of reaction:

| | Grams |
|---|---|
| 2 ethyl hexoic acid | 856 |
| Phthalic anhydride | 1083 |
| Glycerine | 788 |
| Xylene | 145 |

This mixture was heated at reflux (360-434° F.) with agitation for about 12 hours until an acid number of about 25 was obtained. The material was then thinned to 80% non-volatile with xylene.

Example 8

The same ingredients and procedure of Example 7 were used here except that the resin was held at reflux for 2 hours more at which time the acid number was 10. The product was thinned with xylene to 80% non-volatile.

Example 9

The following ingredients were mixed:

| | Grams |
|---|---|
| Product of Example 6 | 235 |
| Product of Example 7 | 1012 |

The mixture was then heated in a vessel equipped with a reflux condenser and condensate trap whereby the condensate was passed through water to remove methanol before returning the condensate to the reaction vessel. Heating at reflux (142-159° C.) for 5¾ hours was continued until the resin solution began to wrap around the stirrer and was thereafter thinned with xylene to 50% non-volatile. The resultant product had an acid number of 11.4 and a viscosity of F (Gardner-Holdt).

Pigment was then ground with the above resin solution in a pebble mill to give an enamel of the following composition:

| | Oz. by wt. |
|---|---|
| Rutile $TiO_2$ | 3.59 |
| Resin solution | 8.0 |

Example 10

The following materials were treated in the manner described in Example 9:

| | Grams |
|---|---|
| Product of Example 6 | 52.5 |
| Product of Example 8 | 225.0 |
| Xylene | 32.0 |

After heating at reflux (153-165° C.) for 9½ hours the resin solution was thinned with xylene to 62.5% non-volatile. The resultant product had an acid number of 2.6 and a viscosity of W—X (Gardner-Holdt).

Pigment was then ground with the above resin solution in a pebble mill to give an enamel of the following composition:

| | Grams |
|---|---|
| Rutile $TiO_2$ | 150 |
| Resin solution | 436 |

Example 11

An alkyd resin was prepared from the following ingredients:

| | Grams |
|---|---|
| Phthalic anhydride | 3070 |
| Glycerine | 2040 |
| Xylene | 100 |

These materials were heated with agitation to reflux in a kettle equipped with a trap for removing water of reaction. Heating at temperatures of 170–188° C. was continued until an acid value of 43 was obtained. During this time a total of 316 g. water was removed. To this solution the following materials were added:

| | Grams |
|---|---|
| Product of Example 6 | 1410 |
| Cyclohexanone | 900 |
| Xylene | 500 |

This mixture was heated at reflux temperature (148–169° C.) with stirring in a vessel equipped with a trap to remove the methanol from the condensate by passing the condensate through water. Heating was continued for about 6 hours. At that point the material was thinned with 3900 g. of xylene and 700 g. of cyclohexanone.

The resulting resin solution had an acid number of 14.2, a non-volatile content of 56.7% and a viscosity of X—Y (Gardner-Holdt).

Pigment was then ground with the above resin solution to give an enamel of the following composition:

| | |
|---|---|
| Rutile $TiO_2$ | 3.51 oz. by wt. |
| Resin solution | 6.5 oz. by volume. |
| Toluene | 1.25 oz. by volume. |
| Butanol | 0.5 oz. by volume. |

Examples 12, 13, 14

All primers and enamels were thinned with butyl acetate or xylene to a normal spraying viscosity. Steel panels were coated as shown in the table below. The prime coats (approximately 0.3 mil dry film thickness) were applied by spraying and were baked for ½ hour at 375° F. The top coats were sprayed to give a dry film thickness of 0.7 mil, and the panels were then baked for ½ hour at 425° F.

| Example | 12 | 13 | 14 |
|---|---|---|---|
| Primer | Example 4 | Example 4 | Example 11. |
| Enamel | | Example 11 | |
| Gloss | low | good | fair. |

Example 13 showed better gloss even after prolonged exposure at 350° F. than did Examples 12 and 14 after such exposure. Example 13 retained superiority in gloss after ultraviolet and weatherometer tests.

Examples 15 and 16

Iron phosphate (Bonderite 1000) treated panels were coated as shown in the table below. The prime coats (approximately 0.5 mil dry film thickness) were applied by spraying and were baked for ½ hour at 375° F. The top coats were sprayed to give dry film thicknesses as indicated and then the panels were baked for ½ hour at 425° F.

| Example | 15 | 16 |
|---|---|---|
| Primer | Example 4 | Example 4. |
| Enamel | Example 9 | Example 10. |
| Enamel film thickness | 1.4 mils | 2.2 mils. |

Examples 15 and 16 showed considerable improvement over the panels of Examples 9 and 10 (latter with no primer) when exposed to the following tests: salt spray, hot soap solution and weatherometer. In addition the gloss, adhesion and flexibility of Examples 15 and 16 were very good.

| Example | 17 | 18 | 19 | 20 |
|---|---|---|---|---|
| Primer | Example 1. | Example 2. | Example 4. | Example 3. |
| Enamel | Example 11. | Example 11. | Example 11. | Example 11. |
| Enamel film thickness | 1.3 mils | 1.1 mils | 1.1 mils | 1.2 mils. |
| Pencil hardness | 7H | 6H | 6H | 5H. |
| Gloss | 100+ | 97 | 100+ | 100+. |

All of the above examples showed excellent weatherometer, salt spray, hot soap and humidity resistances.

Example 21

An iron phosphate (Bonderite 1000) treated panel was coated with the product of Example 4 and baked for ½ hour at 275° F. to give a dry film thickness of 0.5 mil. The enamel of Example 5 was applied over the primer and baked to give a total dry film thickness of 3.0 mils.

The resulting panel showed good abrasion and salt spray resistances, excellent hardness, gloss and very little change in color and gloss when exposed for prolonged periods at 400° F.

Having now described our invention, what we claim is:

1. The method of preparing an article having a durable protective two-coat coating thereon, which comprises: providing a base article which is to be coated and which is capable of withstanding the baking temperatures used to convert the hereinafter-defined applied coatings to a protective coating system; applying to said base a priming coat comprising as the sole film-forming material therein a resinous moiety composed of at least one polymeric polyether derivative of polyhydric phenol, said derivative having alternating aromatic and aliphatic nuclei united through ether oxygen, having terminal epoxy groups and being free of functional groups other than epoxy and hydroxyl groups; baking said base and applied priming coat sufficiently to convert said priming coat to a film which is incompletely cured but which is non-tacky at atmospheric temperatures; then applying on said non-tacky priming coat a pigmented top-coat having a thickness of at least 0.5 mil and comprising as the principal film-forming material therein at least one homogeneous resinous alkyd-silicone copolymer containing polycarboxylic acid which has been chemically combined therewith without consuming all of its carboxyl groups, thereby to provide a principal film-forming material having at least a small amount of carboxyl groups available for reaction with the film-forming material of said primer; and thereafter baking said base and its applied priming and top-coats sufficiently to bring about chemical reaction of carboxyl groups of the top-coat with said priming coat and thereby to convert the two coats to a protective coating system.

2. The method as claimed in claim 1 wherein said top-coat has been pigmented sufficiently to be substantially opaque at film thicknesses of at least 0.5 mil.

3. The method as claimed in claim 2 wherein the said alkyd-silicone copolymer of said top-coat has an acid number below about 100 on a solids basis.

4. The method as claimed in claim 3 wherein said acidic alkyd-silicone copolymer is capable of being gelled when subjected to prolonged heating.

5. The method as claimed in claim 4 wherein the said resinous moiety of the priming coat is a polymeric polyether reaction product of dihydric phenol and polyfunctional halohydrin.

6. The method as claimed in claim 5 wherein the dihydric phenol is bisphenol, wherein the polyfunctional halohydrin is epichlorhydrin, and wherein the "$n$" value of the reaction product is above 1, where "n" is the subscript shown in the general formula:

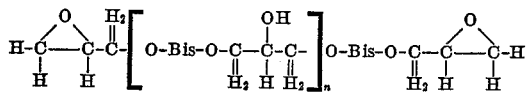

and wherein "Bis" represents the divalent radical 4—4'-diphenyl-2,2-propane.

7. The method as claimed in claim 6 wherein the "n" value is above 3.

8. The method as claimed in claim 1 wherein the said resinous moiety of the priming coat is a polymeric polyether reaction product of dihydric phenol and polyfunctional halohydrin.

9. The method as claimed in claim 8 wherein the dihydric phenol is bisphenol, wherein the polyfunctional halohydrin is epichlorhydrin, and wherein the "n" value of the reaction product is above 1, where "n" is the subscript shown in the general formula:

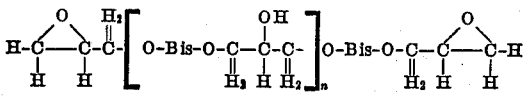

and wherein "Bis" represents the divalent radical 4-4'-diphenyl-2,2-propane.

10. A coated article as prepared by the method of claim 1.

References Cited in the file of this patent
UNITED STATES PATENTS

| | | |
|---|---|---|
| 2,198,939 | Hempel | Apr. 30, 1940 |
| 2,521,911 | Greenlee | Sept. 12, 1950 |
| 2,587,295 | Doyle et al. | Feb. 26, 1952 |
| 2,626,223 | Sattler et al. | Jan. 20, 1953 |
| 2,663,694 | Millar | Dec. 22, 1953 |
| 2,687,396 | McLean | Aug. 24, 1954 |
| 2,687,398 | McLean | Aug. 24, 1954 |
| 2,695,276 | Hatcher | Nov. 23, 1954 |
| 2,699,402 | Meyer | Jan. 11, 1955 |
| 2,776,910 | Erickson | Jan. 8, 1957 |
| 2,782,183 | Johnson | Feb. 19, 1957 |

OTHER REFERENCES

Epon Resins for Surface Coatings (Shell Chemical Corporation) 1953.